(12) United States Patent
Kecht et al.

(10) Patent No.: US 10,981,406 B2
(45) Date of Patent: Apr. 20, 2021

(54) SECURITY FEATURE

(75) Inventors: Johann Kecht, Munich (DE); Kai Uwe Stock, Grunwald (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 1375 days.

(21) Appl. No.: 13/997,247

(22) PCT Filed: Dec. 21, 2011

(86) PCT No.: PCT/EP2011/006489
§ 371 (c)(1),
(2), (4) Date: Jun. 22, 2013

(87) PCT Pub. No.: WO2012/084239
PCT Pub. Date: Jun. 28, 2012

(65) Prior Publication Data
US 2013/0277957 A1    Oct. 24, 2013

(30) Foreign Application Priority Data
Dec. 23, 2010   (DE) ...................... 10 2010 055 976.8

(51) Int. Cl.
*G07D 7/12*     (2016.01)
*B42D 15/00*    (2006.01)
(Continued)

(52) U.S. Cl.
CPC ............. *B42D 15/00* (2013.01); *B42D 25/29* (2014.10); *C09K 11/7774* (2013.01); *D21H 21/48* (2013.01); *G07D 7/1205* (2017.05)

(58) Field of Classification Search
CPC .... B42D 15/00; B42D 25/29; C09K 11/7774; G07D 7/122; D21H 21/48
See application file for complete search history.

(56) References Cited

U.S. PATENT DOCUMENTS 4,452,843 A    6/1984   Kaule et al.
6,383,618 B1   5/2002   Kaule et al.
(Continued)

FOREIGN PATENT DOCUMENTS

CN       102971397 A       3/2013
DE    10 2008 050 768 B3   11/2009
(Continued)

OTHER PUBLICATIONS

Glynn et al. Trapping of optical excitation by two types of acceptors in La0.72Pr0.25Nd0.03F3, Physical Review B vol. 29, No. 9 (May 1984), pp. 4852-4858.*
(Continued)

*Primary Examiner* — David P Porta
*Assistant Examiner* — Shun Lee
(74) *Attorney, Agent, or Firm* — Workman Nydegger

(57) ABSTRACT

A security feature for protecting valuable documents, in particular for ensuring the authenticity of valuable documents, comprises a luminescent pigment which has a host lattice doped with a first luminophore and a second luminophore, with an excitation energy of the first luminophore being transferable to the second luminophore. However, in the case of the luminescent pigment according to the invention, the excitation energy is not transferred completely from the first luminophore to the second, but rather only partially. The incomplete transfer of the excitation energy is achieved by selecting suitable amount-of-substance fractions of the first and the second luminophores on the luminescent pigment. As a result of the incomplete transfer of the excitation energy, the luminescent light that is emitted by the luminescent pigment also has, in addition to a luminescence peak of the second luminophore, a luminescence peak of the first luminophore.

22 Claims, 2 Drawing Sheets

(51) Int. Cl.
   *D21H 21/48* (2006.01)
   *C09K 11/77* (2006.01)
   *B42D 25/29* (2014.01)
   *G07D 7/1205* (2016.01)

(56) References Cited

U.S. PATENT DOCUMENTS

| | | |
|---|---|---|
| 6,802,992 B1 | 10/2004 | Wieczoreck et al. |
| 2002/0130304 A1 | 9/2002 | Paeschke et al. |
| 2007/0096057 A1 | 5/2007 | Hampden-Smith et al. |
| 2007/0202352 A1 | 8/2007 | Giering et al. |
| 2008/0048106 A1* | 2/2008 | Blanchard ............ G07D 7/121 250/252.1 |
| 2009/0267027 A1 | 10/2009 | Takahara et al. |
| 2010/0163747 A1 | 7/2010 | Schwenk et al. |
| 2012/0138856 A1 | 6/2012 | Haubrich et al. |
| 2013/0106090 A1 | 5/2013 | Kecht et al. |

FOREIGN PATENT DOCUMENTS

| | | |
|---|---|---|
| WO | 2005/035271 A2 | 4/2005 |
| WO | 2011/002960 A1 | 1/2011 |
| WO | 2012/003854 A1 | 1/2012 |

OTHER PUBLICATIONS

Kiliaan et al. Energy Transfer in the Luminescent System Na(Y,Gd)F4:Ce,Tb, Journal of the Electrochemical Society vol. 134, No. 9 (Sep. 1987), pp. 2359-2364.*

E. Cantelar et al., "Dynamics of the Yb3+ to Er3+ energy transfer in LiNbO3", Applied Physics B, vol. 69, p. 29-33, Feb. 24, 1999.

Wegh et al., "Visible quantum cutting via downconversion in LiGdF4 : Er3+, Tb3+ upon Er3+ 4f11, 4f10 5d excitation": Journal of Luminescence, 2000, pp. 111-122.

Zhang et al., "Spectroscopic study of the energy transfer effect in Pr~(3+) / Tm~(3+) co-doped with LaOF nanocrystals system," Chinese Sci Bull (Chinese Ver), 2009, pp. 1222-1227. (English Abstract Only).

International Search Report in PCT/EP2011/006489, dated May 4, 2012.

Search Report in German Patent Application 10 2010 055 976.8, dated Mar. 24, 2011.

International Preliminary Report on Patentability and Written Opinion in PCT/EP2011/006489, dated Jun. 25, 2013.

Glaspell et al., "Vapor Phase Synthesis of Upconverting Y2O3 Nanocrystals Doped with Yb3+, Er3+, Ho3+, and Tm3+ to Generate Red, Green, Blue, and White Light," The Journal of Physical Chemistry C, vol. 112, Jul. 3, 2008, pp. 11527-11531.

Lemanski et al., "Efficient Up-conversion Emission and Energy Transfer in LaAlO3 Doped with Er3+, Ho3+, and Yb3+ Ions," Optical Materials, vol. 34, 2012, pp. 1990-1993.

Lisiecki et al., "Luminescence Spectroscopy of Er3+-doped and Er3+, Yb3+-codoped LaPO4 Single Crystals," Journal of Luminescence, vol. 129, 2009, pp. 521-525.

Yang et al., "Color Tunability of Upconversion Emission in YBO3: Yb, Er Inverse Opal," Materials Letters, vol. 65, 2011, pp. 1245-1247.

Zhang et al., "Upconversion Luminescence in Er3+ Doped and Yb3+/Er3+ Codoped Yttria Nanocrystalline Powders," Journal of the American Ceramic Society, vol. 87, No. 6, 2004, pp. 1072-1075.

* cited by examiner

SECURITY FEATURE

BACKGROUND OF THE INVENTION

The invention relates to a security feature and a method for checking the security feature. Such security features are used for safeguarding value documents, in particular for safeguarding the authenticity of the value documents.

For safeguarding value documents, these are equipped with security features and/or with security elements having security features, in order to make possible a check of the authenticity of the value document. The security features and security elements serve to protect the value documents from unauthorized reproduction. As security elements there are used for example security threads or foil elements, which are connected with a value document. The security features can be connected with the substrate of the security element or with the substrate of the value document itself.

As security features there are employed for example luminescence pigments that consist of a host lattice doped with a luminophore. Optical transitions of the luminophore lead to a luminescence of the luminescence pigment. For checking the authenticity of a value document having the luminescence pigment it is checked for example whether the value document has the desired luminescence and, depending thereon, it is decided whether or not the value document is authentic.

From the prior art there are known improved security features having a higher luminosity, in which the luminescence pigment is not only doped with a luminophore but in addition with an activator that makes possible an increased luminescence intensity. In particular, the activator makes possible the excitation of the luminophore in wavelength ranges in which the luminophore is usually not excitable or only poorly excitable. The activator and the luminophore here are chosen such that the activator tends to completely transfer its excitation energy to the luminophore. The activator is selectively optically excited through corresponding light irradiation and then completely transfers its excitation energy to the emitter that subsequently emits a luminescence characteristic thereof. On the basis of this, the authenticity of the value document can be checked. The activator itself, however, shows no luminescence.

In order to make an imitation of the value documents more difficult, it is also known to provide these with a security feature which has a more complex characteristic luminescence spectrum. In order to obtain several luminescence peaks, different luminescence pigments each containing only one luminophore are mixed with each other. Luminescence pigments suitable for security applications, in particular luminescence pigments which luminesce exclusively in the infrared spectral region and are doped with two or more simultaneously luminescing luminophores, are not commercially available, however. The mixing of different luminescence pigments has the disadvantage that the different luminescence pigments of the mixture may segregate, e.g. due to different grain sizes or different densities. Such a segregation of the luminescence pigments of a security feature may take place in particular due to vibrations upon the transport of the security feature or also upon the processing of the security feature for applying it onto the value document. Through the segregation there arises an inhomogeneity of the pigment mixture, which may lead to unintended spatial variations of the luminescence of the security feature on the value document. Such variations may lead to a misjudgement of authentic value documents or make more difficult the recognition of forgeries, that show a luminescence deviating from but similar to the authentic luminescence. In such a security feature that consists of a mixture of several luminescence pigments a homogeneity of the pigment mixture can usually only be achieved with great effort.

It is therefore an object of the present invention to state a security feature which makes possible a more reliable differentiation between authentic and forged value documents.

SUMMARY OF THE INVENTION

The security feature according to the invention comprises a luminescence pigment that has a host lattice doped with a first luminophore and with a second luminophore. Here, at least a volume region of the host lattice is both doped with the first and with the second luminophore. The luminescence pigment can be excited, through an optical excitation, to emit luminescence light. Through the optical excitation of the luminescence pigment there is generated, indirectly or directly, an excitation energy of the first luminophore. The components of the luminescence pigment, in particular the host lattice and the first and second luminophore, are chosen such that an excitation energy of the first luminophore is transferable to the second luminophore. The excitation energy of the first luminophore generated through optical excitation of the luminescence pigment can thus be transferred from the first to the second luminophore through an interaction between the first and the second luminophore. However, with the luminescence pigment according to the invention the excitation energy is not completely transferred from the first to the second luminophore, as it is the case with hitherto known luminescence pigments showing energy transfer, but only partially, i.e. only with a significantly reduced probability in comparison to the known luminescence pigments. The luminescence light emitted by the luminescence pigment according to the invention contains, in addition to a luminescence peak of the second luminophore, also a luminescence peak of the first luminophore. With the known luminescence pigments the complete transfer of the excitation energy from the first to the second luminophore leads to the fact that as a consequence of an optical excitation of the luminescence pigment there is emitted exclusively a luminescence of the second luminophore, while the first luminophore emits no luminescence at all.

With the luminescence pigment according to the invention a partial, i.e. an incomplete, transfer of the excitation energy is achieved by the substance amount fractions of the first and of the second luminophores in the luminescence pigment being suitably chosen. With certain luminescence pigments and certain substance amount fractions, which can be empirically ascertained, a reduced probability of the excitation energy being transferred from the first to the second luminophore can be adjusted in targeted fashion. For example, the substance amount fractions of the second luminophore are chosen in targeted fashion to be so low that the probability of the excitation energy being transferred from the first to the second luminophore is reduced. This reduced probability of energy transfer has an effect on the emitted luminescence light such that this has, in addition to a luminescence peak of the second luminophore, also a luminescence peak of the first luminophore. The substance amount fractions of the first and second luminophores in the luminescence pigment are chosen for the luminescence pigment according to the invention such that the luminescence light of the luminescence pigment has a luminescence spectrum with a first luminescence peak emitted by the first luminophore and with a second luminescence peak emitted by the second luminophore, the peak intensity of the second luminescence peak having a share of at least 20% and at most 80% in the sum of the peak intensities of the first and second luminescence peaks. Accordingly, both the first and the second luminescence peak respectively clearly stand out against the spectral ground of the luminescence spectrum. Due to these properties the luminescence pigment is especially suitable to be used for a security feature for safeguarding value documents.

Preferably, the substance amount fractions of the first and the second luminophores in the luminescence pigment are chosen such that the share of the peak intensity of the second luminescence peak in the sum of the peak intensities of the first and second luminescence peaks amounts to at least 30% and at most 70%, in particular at least 40% and at most 60%. This achieves an improved provability of the one of the two luminescence peaks that has the weaker intensity.

The first and second luminescence peaks preferably have an intensity ratio to each other that is intrinsically defined through the composition of the luminescence pigment. The intensity ratio thus remains unaffected by many external influences on the security feature. In contrast to the abovementioned security features made of a luminescence pigment mixture, which have the problem of segregation and the change of the luminescence spectrum associated therewith, the security feature according to the invention is less sensitive to external influences on the security feature, which is due to the intrinsically defined ratio of the two peak intensities. Also upon processing of the security feature for connecting the same with the value document, the luminescence spectrum of the security feature remains the same. Due to the intrinsically defined intensity ratio it is therefore possible to avoid undesirable spatial variations of the luminescence on a value document and, if desired, to achieve a spatially homogeneous luminescence of the value document with little effort. The security feature according to the invention is advantageous also in comparison to previous security features that have spatially separated luminescence regions, e.g. security features on the basis of core shell particles, which have different luminescence pigments in the core and in the shell of a particle. Because, for the structure of core shell particles only a limited choice of materials is employable, and the controlled manufacturing of these particles is very elaborate. By contrast, the security feature according to the invention can be manufactured with much less effort.

It has been surprisingly discovered that with some luminescence pigments, in certain regions of the substance amount fractions, both luminescence peaks are emitted and the peak intensities thereof are respectively variable through the substance amount fractions of the first and of the second luminophores in the luminescence pigment. For the security features according to the invention there are therefore chosen such luminescence pigments, in which the ratio of the two peak intensities is adjustable in targeted fashion through the substance amount fractions of the first and second luminophores. Through minor changes of the substance amount fractions different intrinsically defined intensity ratios of the two luminescence peaks can be achieved. It has been found that a small variation of the substance amount fraction of the second luminophore has a great influence on the peak intensities of the first and second luminescence peaks. In comparison thereto, a variation of the substance amount fraction of the first luminophore often has only a relatively small influence on the peak intensities of the two luminescence peaks. However, the substance amount fraction x of the first luminophore should not be so great as it is usually chosen with up-conversion luminescence pigments, because with so high substance amount fractions x the peak intensity of the first luminescence peak is strongly suppressed due to concentration quenching. Therefore, with the luminescence pigments according to the invention the substance amount fraction x of the first luminophore in the luminescence pigment is preferably so low, that no or only a negligibly low concentration quenching of the first luminescence peak occurs.

The luminescence light emitted by the luminescence pigment according to the invention as a consequence of the optical excitation has a luminescence spectrum that has a first luminescence peak emitted by the first luminophore and a second luminescence peak emitted by the second luminophore. The first and second luminescence peaks are thus generated through two different luminophores with which the host lattice of the luminescence pigment is doped. Depending on the type of the chosen first and second luminophores and in dependence on the optical excitation, their luminescence may respectively also have further luminescence peaks. In contrast to the previous security features, the first and second luminescence peaks in the security feature according to the invention are emitted by one single luminescence pigment, not by mixture of two or several luminescence pigments. In particular, the first and second luminescence peaks may result from electronic transitions of two different luminophores with which the luminescence pigment is doped, so that the first and second luminescence peaks result from different electronic transitions of the same luminescence pigment.

In the luminescence pigments according to the invention the excitation energy of the first luminophore is transferable from the first to the second luminophore. For the luminescence pigment according to the invention there are employed e.g. combinations of two luminophores, which in the same host lattice have about the same energy-level distances, so that, upon a transition of the first luminophore from an upper to a lower energy level, its energy can be absorbed by the second luminophore through its transition from a lower to an upper energy level. Suitable for this purpose are e.g. luminescence pigments in which an emission band of the first luminophore overlaps with an absorption band of the second luminophore. The transfer of the excitation energy can take place in particular through a resonant energy transfer between the first and the second luminophore. Which luminophores in a host lattice are capable of transferring energy at all, can be inferred from the technical literature. Therefore, many combinations of two luminophores and appropriate host lattice can be stated, that are in principle suitable for the method according to the invention. If there are chosen two luminophores that in a host lattice are capable of an energy transfer, there is reduced in targeted fashion the medium probability of this energy transfer, e.g. by reducing the substance amount fraction of one or both of the luminophores in the host lattice. In practice, the luminescence pigment with the desired luminescence properties can be ascertained on the basis of a usual series of tests, in which the substance amount fractions of the luminophores in the host lattice are varied. As luminescence pigments according to the invention there can subsequently be employed one or several luminescence pigments with those substance amount fractions of luminophores, in which the luminescence peaks of both luminophores clearly stand out in the luminescence spectrum.

The first and second luminophores can be distributed over a partial region of the host lattice. The spatial distributions of the first and second luminophores here may completely or partially overlap. However, luminescence pigments are preferred, in which the first and second luminophores are distributed over the entire host lattice of the luminescence pigment, because in this case the manufacturing effort for the luminescence pigment is low.

The first and second luminophores and the host lattice are chosen such that an optically generated excitation energy of the first luminophore is transferable from the first to the second luminophore through an interaction between the first luminophore and the second luminophore. The optical excitation of the luminescence pigment can be achieved in particular through irradiation of the luminescence pigment with light of a suitable spectral region in which the luminescence pigment absorbs. Through this optical excitation, an excitation energy of the first luminophore is generated, which is then partly transferred to the second luminophore. The second luminophore excited in this way can subsequently in turn give off its excitation energy by emitting luminescence light. Due to the only partial transfer of the excitation energy, also the first luminophore gives off a part of its excitation energy by emitting luminescence light. The excitation energy of the first luminophore can be generated in the manner as follows by optical excitation of the luminescence pigment:

1. Variant

The excitation energy of the first luminophore is generated directly by selective optical excitation of the first luminophore. Subsequently, the excitation energy of the first luminophore is transferred to the second luminophore. For the selective optical excitation of the first luminophore, the luminescence pigment e.g. can be irradiated in targeted fashion with one or several absorption wavelengths of the first luminophore. For this purpose, there can in particular be used a spectrally narrow-band optical excitation.

2. Variant

The excitation energy of the first luminophore is generated—indirectly—by optical excitation of the host lattice and subsequent transfer of the excitation energy from the host lattice to the first luminophore, and then transferred from the first to the second luminophore. Where applicable, the energy generated in the host lattice can be transferred from the host lattice partly to the first luminophore and partly directly to the second luminophore. For the optical excitation of the host lattice, the luminescence pigment e.g. is irradiated in targeted fashion with one or several absorption wavelengths of the host lattice. In particular, for this purpose, the host lattice can be subjected to a spectrally broad-band optically excitation.

These two variants do not exclude each other. In dependence on the components of the security feature according to the invention and in dependence on the chosen optical excitation, the optical excitation can be obtained via either one of the two variants or both variants together. Where applicable, the first and the second luminophores can transfer their excitation energy among each other also mutually, i.e. in both directions. The transfer of the excitation energy from the first luminophore to the second luminophore can be influenced, where applicable, by the host lattice. The host lattice e.g. can be chosen in targeted fashion such that through its influence the transfer of the excitation energy from the first to the second luminophore is suppressed or promoted. Furthermore, the host lattice can be doped with one or several additional dopants, in order to influence in targeted fashion the transfer of the excitation energy.

The invention also relates to a method for proving the security feature, wherein an optical excitation of the luminescence pigment is carried out, in order to optically excite the luminescence pigment to emit the luminescence light, and the intensities of the first and second luminescence peaks contained in the luminescence spectrum of the luminescence pigment are detected. These detected intensities of the luminescence peaks can be the peak intensities or the intensity spectrally integrated over the respective luminescence peak. The optical excitation of the luminescence pigment, through which the excitation energy of the first luminophore is generated, is here effected in accordance with the above-mentioned first and/or in accordance with the above-mentioned second variant. For proving the security feature, the detected intensities of the first and of the second luminescence peaks are evaluated, e.g. in order to check the authenticity of the security feature or the authenticity of a security element, of a printing ink or of a value document having the security feature. The irradiation of the security feature with light and the detection of the intensities as well as, optionally, also the evaluation is carried with a sensor configured therefor.

The substance amount fraction of the luminophore denotes the quantitative relative fraction of the luminophore in the luminescence pigment. The substance amount fraction x of a luminophore is the relative number of luminophore particles (e.g. atoms, ions) in the total particle number which the luminescence pigment has according to its stoichiometric formula. From the concentration parameter, with which the luminophore amount is stated in the stoichiometric formula of the luminescence pigment, the substance amount fraction of the luminophore is therefore calculated by means of division by the total number of particles (atoms, ions) stated in the stoichiometric formula.

In some of the luminescence pigments according to the invention the luminescence spectrum strongly varies in dependence on the exact relative fraction of the two luminophores. Variations of a luminophore fraction within the host lattice can then lead to locally different peak intensities. Therefore, it is preferred that the first and second luminophores are homogeneously distributed in the host lattice. In particular, in the volume region of the host lattice, which volume region is both doped with the first and with the second luminophore, the first and second luminophores respectively are substantially homogeneously distributed.

With some of the previously known security features their luminescence spectrum can be simulated by a similar luminescence spectrum of a forged luminescence pigment. If deviations from the exact chemical composition of the security feature affect the obtained luminescence spectrum only slightly, the identical chemical composition of the luminescence pigment does not have to be necessarily met in order to obtain a sufficiently similar luminescence spectrum. Preferably, for the security feature according to the invention a luminescence pigment is therefore employed that shows a qualitative change of the luminescence spectrum in dependence on the substance amount fraction of the second luminophore. That is, with the luminescence pigment according to the invention the peak intensities do not scale uniformly, but the ratio of the peak intensities of the first and second luminescence peaks changes through change of the substance amount fraction of the second luminophore. It is furthermore preferred that the peak intensities of the first and second luminescence peaks are changeable in mutually opposite fashion through a change of the substance amount fraction of the second luminophore. The opposite change of the peak intensities here results exclusively from the change of the substance amount fraction of the second luminophore, while the substance amount fraction of the first luminophore is left unchanged. Through a change of the substance amount fraction of the second luminophore, the luminescence intensity of one of the two luminescence peaks is then increased at the expense of the other of the two luminescence peaks. This has the advantage, that the forgery resistance of the luminescence pigment is increased. Because, even if the right components of the authentic luminescence pigment should be found for the imitation, the substance amount fraction of the luminophore must be exactly met in order to obtain a luminescence spectrum which comes sufficiently close to that of the security feature. An increase of the substance amount fraction of the second luminophore may lead to the fact that the peak intensity of the first luminescence peak decreases, and that of the second luminescence peak increases.

The components of the luminescence pigment, in particular the host lattice and the first and the second luminophore, are chosen such that these—in case of changed substance amount fractions—tend to completely transfer the excitation energy from the first to the second luminophore, e.g. in case of a correspondingly higher substance amount fraction of the second luminophore. With such a luminescence pigment (not according to the invention), which has the changed substance amount fractions, the excitation energy would be completely transferred to the second luminophore and, accordingly, the peak intensity of the first luminescence peak, in comparison to the peak intensity of the second luminescence peak, would substantially disappear. A complete transfer of the excitation energy can be effected e.g. in a luminescence pigment (not according to the invention) in which the substance amount fraction of the second luminophore is chosen to be many times higher than the substance amount fraction of the second luminophore in the luminescence pigment according to the invention is chosen. To the luminescence pigment according to the invention there can usually be stated such a luminescence pigment that is not according to the invention with complete or almost complete transfer of the excitation energy, which differs from the luminescence pigment according to the invention by an increased substance amount fraction of the second luminophore.

The interaction through which the excitation energy is transferable from the first luminophore to the second luminophore in the luminescence pigment according to the invention, takes place within the volume region of the host lattice, which volume region is both doped with the first and with the second luminophore. As here the interaction takes place within a volume region of the same material (of the luminescence pigment), there arise advantages compared to the known security features that employ spatially separated luminescence regions between which an interaction takes place. Because with these a sufficient spatial proximity of the different luminescence regions must be ensured. The manufacturing of such security features is therefore more elaborate.

In the luminescence pigment according to the invention the interaction through which the excitation energy is transferable from the first luminophore to the second luminophore is a radiationless interaction between the first and the second luminophore. The first and second luminophores are thus configured for the excitation energy to be transferable from the first to the second luminophore without exchange of light quanta. In particular, this can be a dipole-dipole interaction between the first and second luminophore. The radiationless transfer of the excitation energy is advantageous in comparison to known security features that transfer their excitation energy to each other through a radiant interaction, because in the latter case the ratio of the peak intensities can often be varied only via a limited range of values. Furthermore, such security features, in which the exchange takes place via emission and reabsorption of light quanta, often require, due to the low absorption rate, high luminophore concentrations and a complex structure or a spatial separation of the individual luminophores into spatial partial regions, such as e.g. layer systems. With the luminescence pigment according to the invention, besides the transfer of the excitation energy between the first and the second luminophore via the radiationless interaction, there can take place, at best additionally, also a transfer of the excitation energy through an exchange of light quanta.

The peak wavelengths of the first and second luminescence peaks are preferably spectrally spaced apart from each other by at least 20 nm, particularly preferably at least 30 nm. Upon the check of the security feature, the two luminescence peaks can thus be easily spectrally differentiated from each other. Preferably, the peak wavelengths of the first and second luminescence peaks are in the near infrared spectral region, in particular in the spectral region between 750 nm and 2900 nm, preferably between 800 nm and 2200 nm. Particularly the near infrared spectral region is preferred, since these wavelengths lie outside the visible spectral region, so that an inconspicuous use of the security feature is possible. Depending on which host lattice and which first and second luminophores are employed, the luminescence pigment can be optically excitable to emit luminescence light through irradiation with light in the ultraviolet or in the visible spectral region or in the near infrared spectral region.

In the luminescence spectrum of the luminescence pigment, the peak wavelength of the first luminescence peak lies in particular at a smaller wavelength than the peak wavelength of the second luminescence peak. And the peak wavelengths of the first and of the second luminescence peak, in comparison to the optical excitation of the luminescence pigment, are preferably shifted towards larger wavelengths (Stokes emission). While in the reverse case, when the optical excitation lies at a greater wavelength than the luminescence peaks (anti-Stokes emission, as e.g. up-converter luminescence pigments have it), this is advantageous, since with Stokes emission there can be achieved higher luminescence intensities than with anti-Stokes emission. In contrast to up-converter luminescence pigments, with the luminescence pigments according to the invention, therefore already a small amount of the luminescence pigment is sufficient, in order to obtain well provable peak intensities.

The substance amount fraction of the second luminophore in the luminescence pigment preferably lies between at least 0.00005 (50 ppm) and at most 0.004 (4000 ppm), in particular between 50 ppm and 2000 ppm. The first luminophore and/or the second luminophore are preferably chosen from the rare earth ions, in particular from the rare earth ions erbium, holmium, neodymium, thulium, ytterbium.

The host lattice is preferably configured as an inorganic host lattice. In particular, the host lattice can have a perovskite structure or a garnet structure. For example, the host lattice is a scandium-gallium-garnet, an yttrium-aluminum-garnet or a mixed garnet derived therefrom. When the host lattice has a garnet structure or a perovskite structure, this also contains preferably one or several of the elements vanadium, chromium, manganese, iron, cobalt or nickel as an absorbing element. The host lattice can also be an oxide or a mixed lattice with oxide ions, for example a tungstate, phosphate, niobate, tantalate, silicate or aluminate. The host lattice of the luminescence pigment can additionally also be doped with other dopants, which do not luminesce, e.g. with dopants that are required for crystallization. The host lattice can be additionally doped with one or several further luminophores. The luminescence pigment is configured for example as a powder, whose particles consist of the doped host lattice. The particles can have e.g. a grain size in the range of 1 to 20 µm, preferably <6 µm.

The properties according to the invention are only achieved with certain compositions of the luminescence pigment, i.e. certain combinations of the two luminophores, certain substance amount fractions of the luminophores and with certain combinations of luminophore and host lattice. The choice of a different luminophore, of a different substance amount fraction of the luminophore or of a different host lattice leads in general to a luminescence pigment that does not have the properties according to the invention.

The luminescence pigment can also have more than two luminophores with which the host lattice is doped, whereby between several of the luminophores such a transfer of the excitation energy can be effected.

For example, an excitation energy can be partly transferred from a first to a second luminophore, and partly from the second luminophore to a third luminophore as well as, where applicable, to further luminophores. Through the respectively incomplete transfer of the excitation energy it can be achieved that, in doing so, all of these luminophores luminesce and the intensities of the luminescence peaks are employed for proving the respective security feature.

Several luminescence pigments according to the invention that have different shares P of the peak intensity of the second luminescence peak in the sum of the two peak intensities, can be employed for manufacturing security features having different encodings, for example, for providing different types of value documents with different encodings. While for a first security feature there is employed a luminescence pigment that has a first share P of the second peak intensity, further security features receive the luminescence pigment with shares P of the second peak intensity deviating therefrom, the spectral location of the luminescence peaks being as in the first security feature. For encoding different value documents, of course, there can also be used security features, which simultaneously contain different or also several of the luminescence pigments according to the invention. For example, security features can be encoded with different kinds of the luminescence pigments according to the invention, whose first and second luminescence peaks respectively lie at different wavelengths. Then each encoding corresponds to a certain combination of shares P of the respective second peak intensities of the different luminescence pigments of the security feature. The security feature according to the invention can have, apart from the one or several luminescence pigments according to the invention, also one or several other luminescence pigments.

The invention furthermore relates to a security element which has a security feature according to the invention. The security element is destined to be applied on a value document or incorporated in a value document. The security feature is e.g. a security strip, a security thread, a security band or a transfer element for application on a value document. Further, the security element can be admixed to a printing ink, which is destined to be applied on a value document. The printing ink containing the security feature can be printed e.g. in one or several certain regions on the value document. The security feature can also be incorporated in the value document, e.g. by being admixed to the substrate material of the value document, in particular a paper or plastic substrate, upon its manufacture. Furthermore, the invention relates to a security paper and a value document, on or in which a security feature according to the invention is applied or incorporated and/or which has a security element provided with the security feature and/or a printing ink having the security feature. The security feature can be admixed to the security paper upon the manufacture of the security paper. The security feature can be applied over the full area or over a partial area, in particular in the form of characters or patterns, on a surface of the value document or of the security paper or of the security element. Different sections of the value document or of the security paper or of the security element can be provided with security features having different encoding.

The value documents to be safeguarded are for example bank notes, checks, identification documents, passports, credit cards, check cards, tickets, vouchers, shares, deeds, tokens etc.

BRIEF DESCRIPTION OF THE DRAWINGS

Hereinafter the invention will be explained by way of example with reference to the following Figures. There are shown.

DETAILED DESCRIPTION OF PREFERRED EMBODIMENTS

Figure 1A:
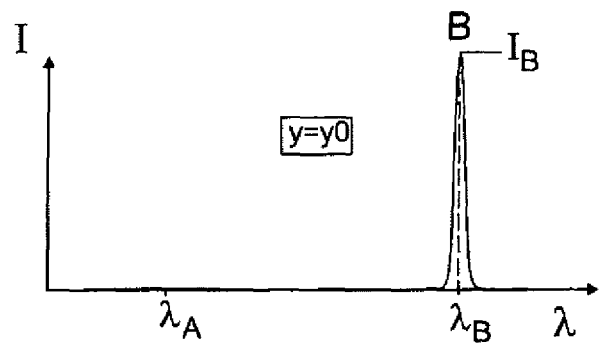
FIG. 1a luminescence spectrum of a luminescence pigment with a luminescence peak B of a second luminophore L2 and disappearing first luminescence of a first luminophore L1, FIGS. 1b,c respectively the luminescence spectrum of a luminescence pigment according to the invention with a first luminescence peak A of a first luminophore L1 and a second luminescence peak B of a second luminophore L2, FIG. 2 course of the share P of the peak intensity of the luminescence peak B of the second luminophore L2 in the sum of the peak intensities of the first luminescence peak A and second luminescence peak B.

In FIG. 1a there is shown the luminescence spectrum of a luminescence pigment that is doped with a first luminophore L1 and a second luminophore L2, between which a complete transfer of their excitation energy takes place. The luminescence spectrum consists of a luminescence peak B at a wavelength $\lambda_B$, which results from the luminescence of the second luminophore L2. The first luminophore acts as an activator that transfers its excitation energy completely to the second luminophore, and thus shows no luminescence at the wavelength $\lambda_A$, at which the first luminophore L1 in isolation usually luminesces. The luminescence pigment from the example of FIG. 1a has the second luminophore L2 with a substance amount fraction y0.

Figure 1B:
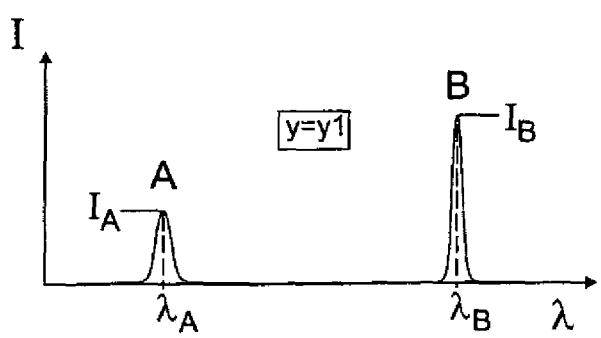
Figure 1C:
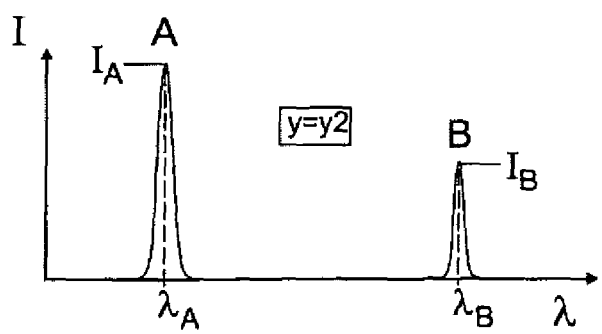

The FIGS. 1b, 1c respectively show the luminescence spectrum of a luminescence pigment according to the invention, which likewise is doped with the first luminophore L1 and the second luminophore L2. The luminescence pigments of the examples of FIGS. 1b, c, compared to the luminescence pigment of FIG. 1a, are characterized by a particular substance amount fraction y with which the second luminophore L2 is contained in the luminescence pigment. The two luminescence pigments of FIGS. 1b, c differ from each other only by the substance amount fraction y of the second luminophore L2, which in the luminescence pigment of FIG. 1b is referred to as y1 and in the example of FIG. 1c as y2.

Both luminescence spectra of the FIGS. 1b, 1c respectively have a luminescence peak A at a wavelength $\lambda_A$, which results from the luminescence of the first luminophore L1, and a luminescence peak B at a wavelength $\lambda_B$, which results from the luminescence of the second luminophore L2. In contrast to the example of FIG. 1a, in these examples therefore also the luminescence of the first luminophore L1 occurs, even though the first luminophore L1 tends to transfer its excitation energy to the second luminophore L2. In the example of FIG. 1b, the intensity ratio $I_A/I_B$ of the two luminescence peaks A, B is about 0.43:1 corresponding to a share $P=I_B/(I_A+I_B)$ of the peak intensity $I_B$ in the sum of the two peak intensities $(I_A+I_B)$ of 70%. In the example of FIG. 1c, the intensity ratio $I_A/I_B$ of the two luminescence peaks A, B is about 1.9:1 corresponding to a share $P=I_B/(I_A+I_B)$ of the peak intensity $I_B$ in the sum of the two peak intensities $(I_A+I_B)$ of 34%.

Figure 2:
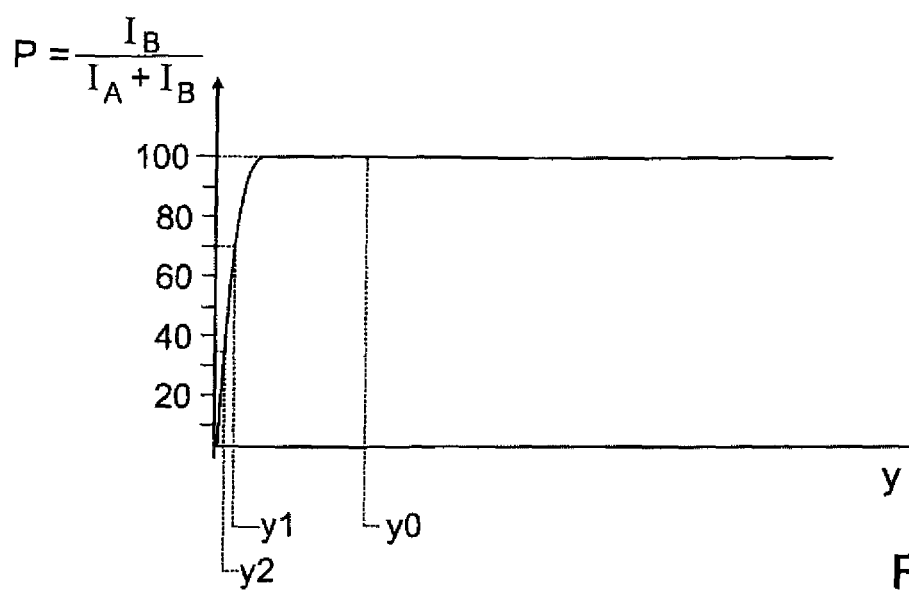

In FIG. 2, the share $P=I_B/(I_A+I_B)$ of the second peak intensity is outlined as a function of the substance amount fraction y of the second luminophore L2. Over a wide range of the substance amount fraction y, the share P of the peak intensity $I_B$ lies at 100%, as with these substance amount fractions y of the second luminophore there takes place a complete transfer of the excitation energy from the first luminophore L1 to the second luminophore L2. Only with very low substance amount fractions y, the share P falls below 100% and is continually reduced to 0% with the substance amount fraction y=0, i.e. when the luminescence pigment has only the first luminophore but no second luminophore L2. With suitable substance amount fractions y of the second luminophore, e.g. y1 and y2, there thus results an incomplete transfer of the excitation energy to the second luminophore. y0, y1, y2 in FIG. 2 mark the substance amount fractions y of the second luminophore L2 in the luminescence pigment in the examples in FIGS. 1a, 1b, 1c.

The luminescence pigment according to the invention shows in dependence of the substance amount fraction y of the second luminophore a qualitative change of the luminescence spectrum, i.e. with the luminescence pigment according to the invention the peak intensities do not scale uniformly, but the ratio of the peak intensities of the first and second luminescence peaks changes upon a change of the substance amount fraction y of the second luminophore. The particular substance amount fraction y of the examples of FIGS. 1b and 1c leads to the fact that the intensity ratio of the two luminescence peaks A and B strongly changes. Upon a change of the substance amount fraction y, an opposite change of the two peak intensities arises in this example. While the peak intensity $I_A$ of the first luminescence peak A is smaller with the substance amount fraction y1 than with the substance amount fraction y2, the peak intensity $I_B$ of the second luminescence peak B is larger with the substance amount fraction y1 than with the substance amount fraction y2. Upon a change of the substance amount fraction y from y1 to y2, the luminescence peak A becomes stronger at the expense of the luminescence peak B.

In the following two concrete examples of luminescence pigments according to the invention are stated for the employment in security features. The luminescence pigments respectively have a host lattice doped with a first and a second luminophore. As in the example shown above, the first and second luminophores are chosen such that the first luminophore L1 acts as an activator and tends to transfer its excitation energy to the second luminophore L2. With substance amount fractions y of the second luminescence pigment L2, according to the invention, there arises an incomplete transfer of the excitation energy, however, so that the luminescence spectrum of the respective luminescence pigment has both the luminescence peak B of the second luminophore L2 as well as the luminescence peak A of the first luminophore L1.

Example 1: $Y_{2.68-y}Ho_yYb_{0.32}Al_5O_{12}$

As a luminescence pigment there is employed a rare-earth-doped yttrium-aluminum-garnet. This is doped with the first luminophore Yb and the second luminophore Ho. The luminescence spectrum of the luminescence pigment has, upon an excitation with light of a wavelength of 941 nm, a first luminescence peak A at $\lambda_A=1027$ nm, which results from the luminescence of the first luminophore Yb, and a second luminescence peak B at $\lambda_B=2086$ nm, which results from the luminescence of the second luminophore Ho. The dependence shown by the share P of the Ho-peak-intensity $I_B$ in the sum $I_A+I_B$ of the two peak intensities $I_A$, $I_B$ on the substance amount fraction y of the second luminophore, qualitatively corresponds to the course shown in FIG. 2.

Example 1a: $Y_{2.64}Ho_{0.04}Yb_{0.32}Al_5O_{12}$

For manufacturing this rare earth-doped yttrium-aluminum-garnet 2.308 g $Y(NO_3)_3 \cdot 6H_2O$, 4.282 g $Al(NO_3)_3 \cdot 9H_2O$, 0.328 g $Yb(NO_3)_3 \cdot 5H_2O$, 0.040 g $Ho(NO_3)_3 \cdot 5H_2O$ and 2.742 g urea are dissolved at 60° C. in 15 g water and subsequently evaporated at 675° C. The Yb-concentration parameter of 0.32 and the Ho-concentration parameter of 0.04, due to the 20-atom stoichiometric formula, correspond to an Yb-substance amount fraction of x=0.016 and an Ho-substance amount fraction of y=0.002. With these substance amount fractions x, y of the first and second luminophores there arises a share $P=I_B/(I_A+I_B)$ of the second peak intensity $I_B$ of about 46%. In this case, the peak intensity $I_A$ of the luminescence peak A and the peak intensity $I_B$ of the luminescence peak B are therefore comparable.

Counter-Example (not According to the Invention) to Example 1: $Y_{2.58}Ho_{0.1}Yb_{0.32}Al_5O_{12}$ For manufacturing this rare earth-doped yttrium-aluminum-garnet 2.256 g $Y(NO_3)_3 \cdot 6H_2O$, 4.282 g $Al(NO_3)_3 \cdot 9H_2O$, 0.328 g $Yb(NO_3)_3 \cdot 5H_2O$, 0.101 g $Ho(NO_3)_3 \cdot 5H_2O$ and 2.742 g urea are dissolved at 60° C. in 15 g water and subsequently evaporated at 675° C. The Yb-concentration parameter of 0.32 and the Ho-concentration parameter of 0.1, due to the 20-atom stoichiometric formula, correspond to an Yb-substance amount fraction of x=0.016 and an Ho-substance amount fraction of y=0.005. With this luminescence pigment there arises a share $P=I_B/(I_A+I_B)$ of the second peak intensity $I_B$ of about 86%, corresponding to a ratio of the peak intensity of the Ho-luminescence peak to the peak intensity of the Yb-luminescence peak of 6:1.

Example 2: $Na_{0.9875}Er_{0.0025}Ho_{0.01}Ti_{0.025}Nb_{0.975}O_3$

As a luminescence pigment there is employed a rare-earth-doped sodium niobate, which is doped with the first luminophore Er and the second luminophore Ho. For manufacturing this rare-earth-doped niobate 2.808 g $Na_2CO_3$, 6.956 g $Nb_2O_5$, 0.107 g $TiO_2$, 0.0257 g $Er_2O_3$ and 0.101 g $Ho_2O_3$ are homogenized in an agate mortar and ignited in a corundum crucible for 8 h at 1150° C. The luminescence spectrum of the luminescence pigment has, upon an excitation with light of a wavelength of 650 nm, a first luminescence peak A at $\lambda_A=982$ nm, which results from the luminescence of the first luminophore Er, and a second luminescence peak B at $\lambda_B$=1200 nm, which results from the luminescence of the second luminophore Ho. The Er-concentration parameter of 0.0025 and the Ho-concentration parameter of 0.01, due to the 5-atom stoichiometric formula, correspond to an Er-substance amount fraction of x=0.0005 and a Ho-substance amount fraction of y=0.002. With these substance amount fractions x of the first luminophore Er and of the second luminophore Ho there arises a share $P=I_B/(I_A+I_B)$ of the second peak intensity $I_B$ of about 40%, corresponding to a ratio of the peak intensity of the Ho-luminescence peak to the peak intensity of the Er-luminescence peak of 2:3.

Counter-Example (not According to the Invention) to Example 2:
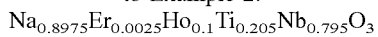

As in example 2, a rare-earth-doped sodium niobate is considered a luminescence pigment. For manufacturing this rare-earth-doped niobate 2.517 g $Na_2CO_3$, 5.591 g $Nb_2O_5$, 0.866 g $TiO_2$, 0.0252 g $Er_2O_3$ and 0.999 g $Ho_2O_3$ are homogenized in an agate mortar and ignited in a corundum crucible for 8 h at 1150° C. The Er-concentration parameter of 0.0025 and the Ho-concentration parameter of 0.1, due to the 5-atom stoichiometric formula, correspond to an Er-substance amount fraction of x=0.0005 and a Ho-substance amount fraction of y=0.02. With this luminescence pigment there arises a share $P=I_B/(I_A+I_B)$ of the second peak intensity $I_B$ of about 93%, corresponding to a ratio of the peak intensity of the Ho-luminescence peak to the peak intensity of the Er-luminescence peak of 13.3:1.

The invention claimed is:

1. A security feature for safeguarding value documents, comprising:
a luminescence pigment that has a host lattice doped with a first luminophore and a second luminophore and that is optically excitable to emit luminescence light, wherein the luminescence pigment is configured that an excitation energy of the first luminophore generated through optical excitation of the luminescence pigment is transferable to the second luminophore through an interaction between the first luminophore and the second luminophore,
wherein the substance amount fraction of the first luminophore in the luminescence pigment and the substance amount fraction of the second luminophore in the luminescence pigment are chosen such that the luminescence light of the luminescence pigment has a luminescence spectrum with a first luminescence peak emitted by the first luminophore and a second luminescence peak emitted by the second luminophore, wherein the share of the peak intensity of the second luminescence peak is at least 20% and at most 80% in the sum of the peak intensities of the first and of the second luminescence peak,
wherein the substance amount fractions of the first and of the second luminophores in the luminescence pigment are further chosen such that an incomplete transfer of the excitation energy from the first to the second luminophore is achieved, and
wherein the substance amount fraction of the second luminophore in the luminescence pigment lies between 50 ppm and 2000 ppm.

2. The security feature according to claim 1, wherein the peak intensity of the first luminescence peak and the peak intensity of the second luminescence peak have an intensity ratio to each other that is intrinsically defined by the composition of the luminescence pigment.

3. The security feature according to claim 1, wherein the first and second luminophores are respectively substantially homogeneously distributed in a volume region of the host lattice, which volume region is both doped with the first luminophore and with the second luminophore.

4. The security feature according to claim 1, wherein through a change of the substance amount fraction of the second luminophore, the peak intensities of the first and second luminescence peaks are changeable in mutually opposite fashion.

5. The security feature according to claim 1, wherein the peak wavelengths of the first and second luminescence peaks are spectrally spaced apart from each other by at least 20 nm.

6. The security feature according to claim 1, wherein the interaction through which the excitation energy is transferable from the first luminophore to the second luminophore and takes place within a volume region of the host lattice, which volume region is both doped with the first luminophore and with the second luminophore.

7. The security feature according to claim 1, wherein the excitation energy of the first luminophore is transferable from the first luminophore to the second luminophore through a radiationless interaction.

8. The security feature according to claim 1, wherein the peak wavelengths of the first and second luminescence peaks lie in the near infrared spectral region.

9. The security feature according to claim 1, wherein the first and/or the second luminophores are chosen from the rare earth ions.

10. The security feature according to claim 1, wherein the host lattice is configured as an inorganic host lattice, wherein the host lattice is a host lattice with a garnet structure or with a perovskite structure or an oxide or a mixed lattice with oxide ions.

11. The security feature according to claim 1, wherein a peak wavelength of the first luminescence peak lies at a smaller wavelength than a peak wavelength of the second luminescent peak.

12. The security feature according to claim 11, wherein the peak wavelength of the first luminescent peak lies at a greater wavelength than a wavelength of the optical excitation.

13. The security feature according to claim 1, wherein the host lattice of the luminescence pigment is doped with at least a third luminophore wherein the luminescence pigment is configured that an excitation energy of the second luminophore generated through the interaction between the first luminophore and the second luminophore is transferable to the third luminophore through an interaction between the second luminophore and the third luminophore
wherein the substance amount fraction of the first luminophore in the luminescence pigment, the substance amount fraction of the second luminophore in the luminescence pigment and a substance amount fraction of the third luminophore are chosen such that the luminescence light of the luminescence pigment has a luminescence spectrum with a first luminescence peak emitted by the first luminophore, a second luminescence peak emitted by the second luminophore and a second luminescence peak emitted by the second luminophore, and
wherein the substance amount fractions of the first, of the second and of the third luminophores in the luminescence pigment are further chosen such that an incomplete transfer of the excitation energy from the first to the second luminophore and from the second to the third luminophore is achieved.

14. The security feature according to claim 1, wherein the first and/or the second luminophores are chosen from the rare earth ions erbium, holmium, neodymium, thulium, and ytterbium.

15. The security feature according to claim 1, wherein the components of the luminescence pigment are chosen such that an increase in the substance amount fraction of the second luminophore would result in an increased transfer of excitation energy from the first to the second luminophore, until the substance amount fraction is such that a complete transfer of excitation energy from the first to the second luminophore occurs.

16. A security element or printing ink, which has a security feature according to claim 1.

17. A value document or security paper, which has a security element and/or a printing ink according to claim 16.

18. A method for proving a security feature according to claim 1, comprising irradiating the security feature with light of a spectral region in which the luminescence pigment of the security feature absorbs, in order to optically excite the luminescence pigment to emit the luminescence light, and detecting intensities of the first and second luminescence peak contained in the luminescence spectrum of the luminescence light, and evaluating the detected intensities of the first and second luminescence peak to prove the security feature.

19. The method according to claim 18, wherein through the irradiating of the security feature an excitation energy of the first luminophore is generated, which is partly transferred from the first luminophore to the second luminophore, the excitation energy of the first luminophore being generated directly through selective optical excitation of the first luminophore, and/or being generated through optical excitation of the host lattice and subsequent transfer of the excitation energy from the host lattice to the first luminophore.

20. A security feature for safeguarding value documents, comprising:

a luminescence pigment that has a host lattice doped with a first luminophore and a second luminophore and that is optically excitable to emit luminescence light, wherein the luminescence pigment is configured that an excitation energy of the first luminophore generated through optical excitation of the luminescence pigment is transferable to the second luminophore through an interaction between the first luminophore and the second luminophore, wherein the substance amount fraction of the first luminophore in the luminescence pigment and the substance amount fraction of the second luminophore in the luminescence pigment are chosen such that the luminescence light of the luminescence pigment has a luminescence spectrum with a first luminescence peak emitted by the first luminophore and a second luminescence peak emitted by the second luminophore, wherein the share of the peak intensity of the second luminescence peak is at least 20% and at most 80% in the sum of the peak intensities of the first and of the second luminescence peak, wherein the substance amount fractions of the first and of the second luminophores in the luminescence pigment are further chosen such that an incomplete transfer of the excitation energy from the first to the second luminophore is achieved, wherein the peak wavelengths of the first and second luminescence peaks lie in the near infrared spectral region, the peak wavelength of the first luminescence peak lies at a smaller wavelength than the peak wavelength of the second luminescent peak, and the peak wavelength of the first luminescent peak lies at a greater wavelength than a wavelength of the optical excitation, and wherein the first and/or the second luminophores are chosen from the rare earth ions erbium, holmium, neodymium, thulium, and ytterbium.

21. The security feature according to claim 20, wherein the substance amount fraction of the second luminophore in the luminescence pigment lies between 50 ppm and 2000 ppm.

22. The security feature according to claim 20, wherein the host lattice is configured as an inorganic host lattice, wherein the host lattice is a host lattice with a garnet structure or with a perovskite structure or an oxide or a mixed lattice with oxide ions.

* * * * *